United States Patent [19]

Hill et al.

[11] Patent Number: 5,067,467

[45] Date of Patent: Nov. 26, 1991

[54] INTENSIFIER-INJECTOR FOR GASEOUS FUEL FOR POSITIVE DISPLACEMENT ENGINES

[75] Inventors: Philip G. Hill; Ronald J. Pierik, both of Vancouver; K. Bruce Hodgins, Delta, all of Canada

[73] Assignee: The University of British Columbia, Vancouver, Canada

[21] Appl. No.: 441,104

[22] Filed: Nov. 27, 1989

[30] Foreign Application Priority Data

Nov. 29, 1988 [CA] Canada ................................. 584496

[51] Int. Cl.$^5$ ............................................. F02M 39/00
[52] U.S. Cl. ..................................... 123/497; 123/525; 417/380
[58] Field of Search ................ 123/497; 417/380, 525; 239/87, 585

[56] References Cited

U.S. PATENT DOCUMENTS

| | | | |
|---|---|---|---|
| 4,098,560 | 7/1978 | O'Neil | 417/380 |
| 4,141,675 | 2/1979 | O'Neil | 417/380 |
| 4,201,160 | 5/1980 | Fenne | 123/531 |
| 4,306,680 | 12/1981 | Smith | 417/380 |
| 4,406,404 | 9/1983 | Horino et al. | 239/91 |
| 4,599,983 | 7/1986 | Omachi | 123/497 |

FOREIGN PATENT DOCUMENTS

527395 4/1954 Belgium ............................ 417/380

OTHER PUBLICATIONS

J. F. Wakenell et al., "High Pressure Late Cycle Direct Injection of Natural Gas in a Rail Medium Speed Diesel Engine", SAE Technical Paper 872041, 11/87.
Einang, P. M. et al., "High-Pressure, Digitally Controlled Injection of Gaseous Fuel in a Diesel Engine, with Special Reference to Boil-Off from LNG Tankers", Proceedings CIMAC Conf., Jun. 1983.
Miyake, M. et al., "The Development of High Output, Highly Efficient Gas Burning Diesel Engines", Proceedings CIMAC Conf.
Prof. A. Sarsten et al., "Dual-Fuel Diesels Reviewed—New Design Burning Gas and Oil in Any Ratio at Higher Efficiencies", Gastech 82 Conference Papers, Oct. 5–8.
Einang, P. M. et al., "Medium Speed 4-Stroke Diesel Engine Using High Pressure Gas Injection Technology".
B. Engesser, "RTA Dual—Fuel Engine-Natural Gas Instead of Diesel Oil", Sulzer Technical Review 1/1987.
"Dual-Fuel, Two-Stroke Diesels for Lean Gas Applications", Oct. 1989.
Rolf Vestergren, "Wartsila Diesel Introduces a New Gas-Diesel Engine".
A. Sudano, D. Miele, T. Krepec, "Improved Concept of Natural Gas Use in High Speed Internal Combustion Engines".

*Primary Examiner*—E. Rollins Cross
*Attorney, Agent, or Firm*—Seed and Berry

[57] ABSTRACT

This invention relates to a novel device for compressing and injecting gaseous fuel from a variable pressure gaseous fuel supply into a fuel receiving apparatus. More particularly, this invention relates to an intensifier-injector which compresses and injects gaseous fuel from a variable pressure source into the cylinder of a positive displacement engine. An intensifier-injector for gaseous fuels in internal combustion engines comprising means which utilizes the compressed gas from the chamber of the internal combustion engine or compressed fluid or gas from an external compressor to drive an intensifier means which raises the pressure of fuel gas supplied to the internal combustion engine for rapid late-cycle injection into the cylinder of the internal combustion engine.

48 Claims, 14 Drawing Sheets

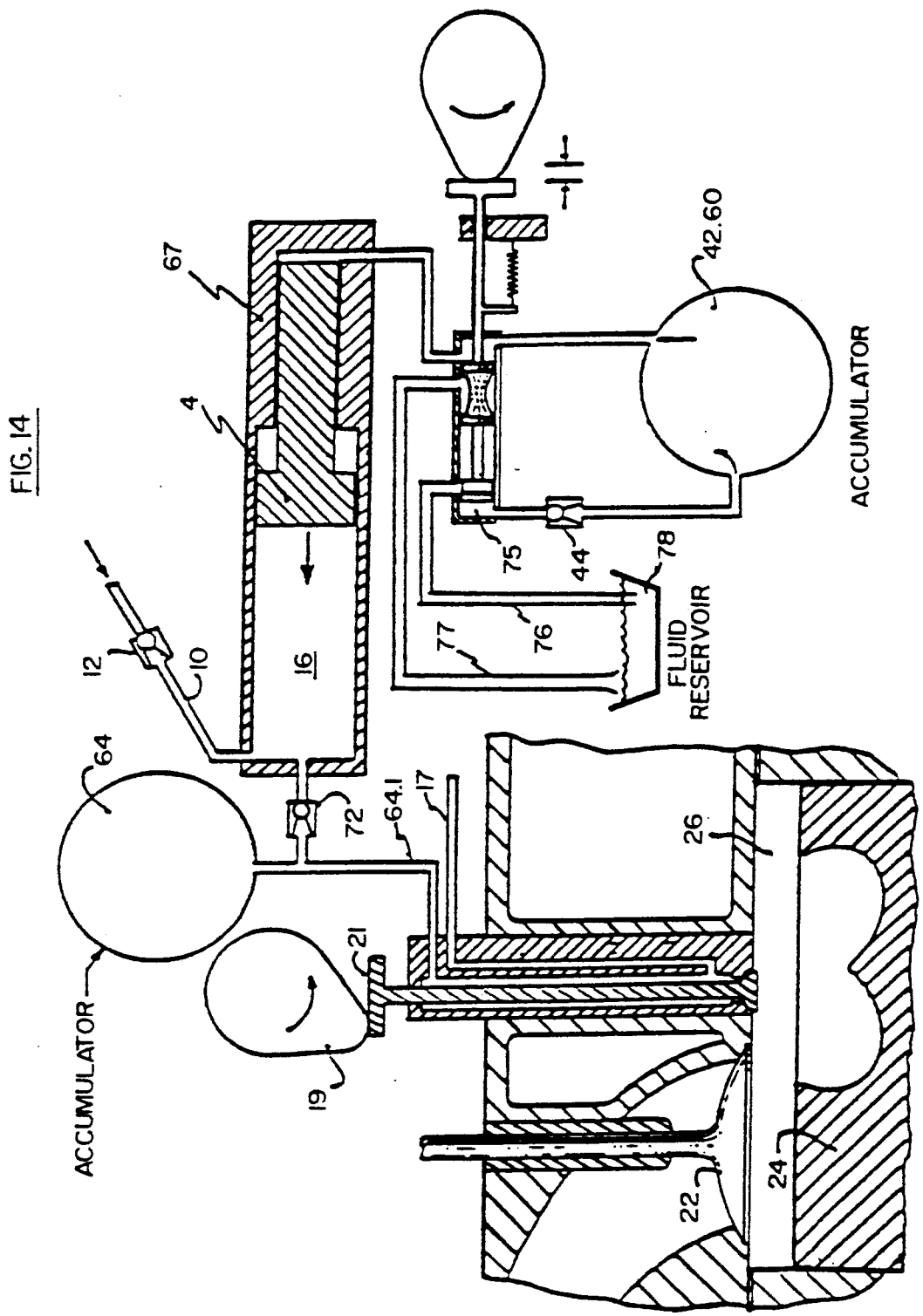

INTENSIFIER-INJECTOR FOR GASEOUS FUEL FOR POSITIVE DISPLACEMENT ENGINES

FIELD OF THE INVENTION

This invention relates to a novel device for compressing and injecting gaseous fuel from a variable pressure gaseous fuel supply into a fuel receiving apparatus. More particularly, this invention relates to an intensifier-injector which compresses and injects gaseous fuel from a variable pressure source into the cylinder of a positive displacement engine.

BACKGROUND OF THE INVENTION

Because of its ready availability and because of its relatively low cost and potential for reducing particulate emissions, compressed natural gas is a promising candidate for fueling diesel engines. Conventional me&:hods of fueling diesel engines by premixing air and natural gas appear to be inherently unsuitable for part load operation, at which the fuel-air mixture flammability suffers, efficiency drops substantially and emissions become excessive. In addition there is the problem of detonation under certain load conditions. These factors generally impose a limit on the feasible substitution of diesel fuel by natural gas in transport engines operating over a wide range of load and speed.

Fueling Diesel Engines with Premixed Air and Natural Gas

Much work has been done on the "natural fumigation" method of using natural gas in a diesel engine by injecting it into the inlet manifold, with injection into the cylinder of small quantities of diesel fuel for "pilot" diesel ignition. There are three major faults with this method:

1) At low load, with unthrottled diesel operation, the gas fuel and air mixture (which is essentially homogeneous) is too lean for satisfactory combustion and fuel efficiency can become unacceptable. A remedy may be to revert to mainly diesel fuel consumption at part load. However, since in many applications most of the operation may be at part load, this tends to defeat the fundamental objective of fuel substitution.
2) With low efficiency in part load operation, the emissions of unburned hydrocarbons and carbon monoxide will rise far above the acceptable limits.
3) With successful pilot diesel ignition of natural gas, engine pressure loading (both maximum pressure levels and incidence of detonation) can be harmful and there is danger of engine damage. There is typically a band of mixture strength at which the engine is prone to knock due to excessively rapid flame propagation.

The problem of the premixed gas and air forming too lean a mixture (at part load) could be alleviated by throttling the inlet air. However, this is not feasible with existing turbo-charged engines because of the danger of compressor surge. In any case throttling removes one of the inherent advantages of diesel operation.

The problem could also in principle be alleviated by preheating the air at part load; however this may adversely affect turbo-charger operation and increase the danger of detonation. A control system would be required to adjust the heating rate with load and speed and it is questionable whether at low load the exhaust heat available would be sufficient.

Control systems have been devised to vary the diesel/gas proportion as a function of load and speed. To provide acceptable operation these require detailed engine-specific performance data banks to be stored within the computers required for engine control. Development of such a system is costly and must involve compromise between the objectives of low fuel consumption, low emissions, engine durability and high fuel substitution.

Problems encountered with "natural fumigation" methods are fundamental i.e. not peculiar to one type of combustion chamber. Thus, if emissions, fuel economy during part load operation, and engine durability are each important, premixing the air and gas is not a generally suitable method for dual fueling in diesels.

An alternative method, "timed port injection", has been proposed for injection of natural gas into two-stroke diesel engines. The objective is to time the injection of natural gas into the inlet port so as to avoid wasted gas leaving with the exhaust and (ideally) at low load to have the gas stratified within the cylinder so that it can burn acceptably after compression and diesel pilot ignition. So far, this method to the applicants' knowledge has not proven capable of high efficiency, durable, clean operation over a wide range of load and speeds and with high levels of fuel substitution.

Direct Injection of Natural Gas into Diesel Engine Cylinders

The great advantage of direct injection of fuel into the engine cylinder in diesel operation is that it permits efficient and stable burning over the whole load range. This is because the burning occurs in local regions in which the fuel-air ratio is within the flammability limits. Natural gas has the advantage over diesel fuel in that it does not require atomization into (micron-size) droplets and thus does not require very high injection pressures and super fine tolerances on injector plungers. For diesel injection, pressures may need to be as high as 1000 atm for most efficient operation. It appears that for natural gas 200 atm would be satisfactory.

Successful operation of large bore diesels with diesel injection of compressed natural gas has been demonstrated in North America, see J. F. Wakenell, G. B. O'Neal, and Q. A. Baker, "High-Pressure Late Cycle Direct Injection of Natural Gas in a Rail Medium Speed Diesel Engine", SAE Technical Paper 872041, in Norway, see Einang, P. M., Korea, S., Kvamsdal, R., Hansen, T., and Sarsten, A., "High-Pressure, Digitally Controlled Injection of Gaseous Fuel in a Diesel Engine, with Special Reference to Boil-Off from LNG Tankers", Proceedings CIMAC Conf., June 1983; and Japan, see Miyake, M., Biwa, T., Endoh, Y., Shimotsu, M., Murakami, S., Komoda, T., "The Development of High Output, Highly Efficient Gas Burning Diesel Engines". The gaseous fuel for these engines was available at a constant high pressure. The work by Wakenell, et al., carried out at Southwest Research Institute, involved direct injection of natural gas into a large bore (8.5") 2-stroke, locomotive diesel engine. The natural gas was stored in liquid form (LNG), then pumped to high pressure and vaporized to give gaseous injection pressures of 5000 psi (340 atm.). The gas injector valve replaced the diesel injector and a small diesel injector was installed in the "test-cock" hole in the cylinder head. Full rated power was achieved with less than 2% pilot diesel fuel (98% natural gas) and thermal efficiency was slightly lower than 100% diesel operation. The Norwegian work, carried out under the direction of Professor Arthur Saarsten at Trondheim, involved the direct injection of methane gas into a large bore (300 mm) two-stroke single-cylinder engine. The injection pressure was in the range 150–160 atm. The diesel injector was left unmodified and a hole was bored in the cylinder head for a gas injection valve. With 73% (energy proportion) natural gas fueling, thermal efficiencies were slightly better than when running with 100% diesel oil. In preliminary tests gas injection gave only slightly higher smoke reading than with 100% diesel and NOx emissions were reduced about 24%.

The Japanese work, carried out at the Mitsui Engineering and Ship Building Company, included study of the gas jet velocity field in the cylinder and tests on a large bore (420 mm) single cylinder four-stroke engine. The gas was injected at about 250 atm. In one test series, the pilot diesel fuel was injected through a separate diesel injection system. With as low as 5% diesel pilot fuel energy input, the overall efficiency at 85% of engine load was the same as with full diesel fueling. An improved fuel injection nozzle with integral injection of the diesel pilot fuel also provided satisfactory performance. The overall result was that "almost equal" performance was obtained with natural gas fueling as with 100% diesel operation.

With the natural gas stored on the vehicle in liquid form (LNG), i.e. at very low temperatures in a well insulated tank, the liquid can be readily compressed (and probably vaporized) before injection into the engine cylinder. However, wide spread availability of LNG for vehicles is not now foreseeable, whereas compressed natural gas (CNG) is quite widely available. Experience on large bore diesel engines, while not directly applicable to medium bore engines used for bus and truck applications, is indicative that natural gas could be burned satisfactorily in these engines with direct injection.

A problem for transport engines is that the gas will not be available at a constant supply pressure.

An Integrated Intensifier-Injector For Compressed Natural Gas used in Transport Diesel Engines For CNG it appears that the safe upper limit for gas storage will be about 200 atm, which is near the required injection pressure. However, to obtain 93% of the energy stored in the tank, the pressure will have to be allowed to drop to about 20 atm before refueling. The energy required to recompress from 20 atm to 200 would be a small part of what is required for the compression from 1 atm to 200.

It would be desirable for direct injection of CNG into diesel engines to have a system which will:
 (i) replace the conventional injector with no modification of other engine parts
 (ii) compress the natural gas as needed, as well as inject it into the cylinder, as the gas supply pressure varies from 200 to 20 atm
 (iii) permit simultaneous injection of diesel pilot fuel (or other additives) for ignition
 (iv) be capable of precise control of injection quantity, timing, and duration
 (v) be adaptable in design to commercial unit injector systems
 (vi) be adaptable to any composition of natural gas.

The CNG must be compressed to operating levels, particularly when the pressure of the CNG drops to relatively low levels.

This CNG pressure intensification must be adjustable and controlled to provide the required amount of pressurized CNG to the engine, which varies with engine speed and load, regardless of CNG storage pressure. It is essential that this process be efficient to minimize engine power and efficiency losses. A further restriction to the intensifier system is physical size and orientation which is limited on many applications such as urban buses.

Two U.S. patents disclose fuel injection systems:

U.S. Pat. No. 4,406,404, "Diesel Fuel Injection Nozzle", Horino et al. Sept. 27, 1983, discloses a method of injecting fuel into the combustion chamber of a diesel engine cylinder. Included is a plunger mounted in a nozzle body to define an air chamber for receiving compressed air from the combustion chamber during the compression stroke of the piston in the engine cylinder. Formed integral with the plunger, a needle valve defines within the nozzle body a fuel chamber for receiving fuel to be injected. A nozzle tip secured to the nozzle body founds a premixing chamber open directly to the combustion chamber and further in communication with both air chamber and fuel chamber. Thus, upon descent of the plunger at the end of the compression stroke, the fuel from the fuel chamber is intimately premixed in the premixing chamber with the compressed air from the air chamber, prior to introduction into the combustion chamber.

Horino et al specify that "the fuel from the fuel chamber is intimately premixed within the premixing chamber with the compressed air from the air chamber prior to introduction into the combustion chamber". Thus premixing, and a premixing chamber are required, the fuel and air are not mixed in the engine chamber;

The Horino et al device relates to "diesel fuel" only. There is no mention of natural gas or of dealing with the essential problem of how to compress and inject a gaseous fuel into a compression-ignition engine;

Horino et al do not mention a pilot injection of liquid diesel fuel (or other means) which is required to assist in compression ignition of the natural gas. They also do not mention an intensifier mechanism.

U.S. Pat. No. 4,201,160, "Fuel Injection Systems", Fenne and Greenford, May 6, 1980, discloses a fuel injection system for supplying fuel to a combustion space of an internal combustion engine. This includes a fuel injection nozzle having a fuel inlet and outlets which direct fuel into, the combustion space. A piston is provided with a cylinder, one end of which is subjected to the pressure within the combustion space. The other end of the cylinder communicates with the inlet of the nozzle and a valve is provided whereby a fuel injection pump is held out of communication with the inlet of the nozzle until the piston has moved inwardly under the action of rising pressure within the combustion chamber. During the inward movement fuel is displaced by the piston to the nozzle and this is supplied as a pilot quantity of fuel to the combustion space.

Fenne et al disclose that the fuel injector is a supplementary injector to provide early injection of a small portion of the fuel requirement, see "the main quantity of fuel being supplied by the main pump to the nozzle". All of the fuel is not delivered by a single unit.

Fenne et al do not mention gaseous fuel nor do they include provision for intensifying the fuel pressure (i.e. increasing the fuel pressure to at least twice the pressure of the compressed air which actuates the intensifier).

SUMMARY OF THE INVENTION

The invention is a new device for compression and injection of gaseous fuel from a variable pressure supply (along with possible use of an entrained liquid fuel which could serve as an ignition source) into the cylinder of an internal combustion engine. If entrained liquid fuel is desired for ignition, the gas injection at high velocity could atomize the liquid fuel. The primary application of the invention is to compression ignition (diesel) engines but secondary fields of application are spark, catalytic surface, and hot surface ignition engines.

The invention involves a method and an intensifier-injector for gaseous fuels in internal combustion engines comprising means which utilizes a compressed gas or fluid to drive an intensifier means which raises the pressure of fuel gas supplied to the internal combustion engine for rapid injection into the cylinder of the internal combustion engine. Sources of the intensifier drive gas or fluid include, but are not limited to: compressed air from the cylinder of the turbocharged or superchared internal combustion engine; compressed air from an external compressor, e.g. airbrake compressor; high pressure hydraulic fluid diesel fuel; pressurized or lube oil; or air compressed by a turbocharger or supercharger.

The invention pertains to an apparatus as defined, wherein the internal combustion engine is a positive displacement engine.

An apparatus as defined, wherein the gaseous fuel is drawn from a variable pressure gaseous fuel supply.

In the preferred embodiment, the intensifier-injector for fuel gas used in combination with an internal combustion engine having a cylinder chamber which intensifier-injector comprises:

(a) a hollow chamber means;
(b) a reciprocating intensifier means having a large area end and a small area end mounted within the interior of the hollow chamber means;
(c) a means for introducing compressed gas or fluid from the intensifier drive source into the hollow chamber means on the large area end of the intensifier means;
(d) one-way means for enabling fuel gas to be supplied into the hollow chamber means at the small area end of the intensifier means;
(e) nozzle means for enabling the fuel gas at the small area end of the intensifier means to be injected into the cylinder chamber; and
(f) timing means, synchronized with the internal combustion engine for opening and closing the nozzle means (e).

DRAWINGS

In the drawings which depict specific embodiments of the invention but which should not be construed as restricting or confining the spirit of scope of the invention in any way:

FIG. 14 illustrates a schematic view of an intensifier driven by high pressure fluid from a cam driven plunger. In this case, since the desired fuel-gas pressure is less than the intensifier driver fluid, the high pressure fluid acts on the small area end of the intensifier piston and the fuel gas is compressed by the large area end of the intensifier piston.

DETAILED DESCRIPTION OF SPECIFIC EMBODIMENTS OF THE INVENTION

Figure 1:
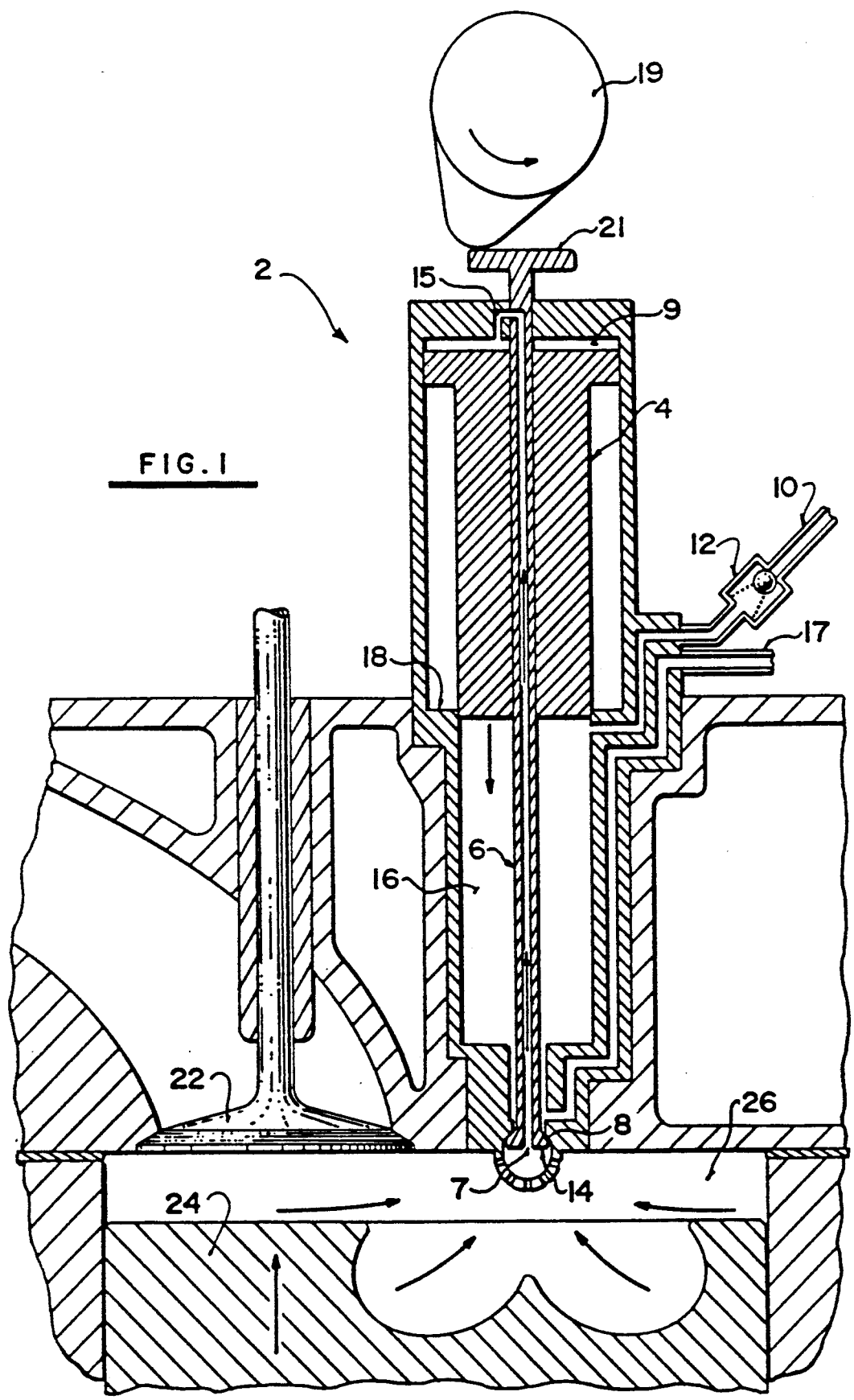
FIG. 1 illustrates a schematic diagram of the intensifier-injector for gaseous fuels.

To enable direct injection of gaseous fuel into diesel systems, a unit is desired which will:

(i) replace the conventional injector with no modification of engine cylinder, head or piston;
(ii) compress the natural gas or other gaseous fuel, as needed, as well as inject it into the cylinder. The gas supply will typically vary in pressure from 200 to 20 atm;
(iii) permit simultaneous injection of diesel pilot fuel or other additives for ignition, or be adaptable to use of an alternative ignition method e.g. spark plug catalytic surface, or hot surface ignition;
(iv) enable precise control of injection quantity, timing and duration;
(v) adapt readily in design to current engines having unit injector systems and
(vi) accommodate any composition of gaseous fuel.

The subject invention represents a novel advance over present technology in that it enables on board compression to high pressure of a gaseous fuel from a variable pressure source. One method of fuel gas pressure intensification uses a portion of compressed air, obtained during the compression stroke, or possibly combustion gas, to drive an intensifier which singly or in association with supplemental compression raises the pressure of the fuel gas sufficiently for rapid gas injection into the engine cylinder. The intensifier can also be driven by an available low pressure compressed air supply such as is commonly used for vehicle air brakes. High pressure gaseous fuel injection can be used to "gas blast" atomize the pilot liquid fuel injection invention is not limited to pilot liquid fuel ignition, but can coexist with glow plug or spark-assisted ignition.

One purpose of the invention is to permit high-efficiency low-pollution use of gaseous fuels in diesel engines, while preserving the advantages of high compression ratio non-throttling operation.

The invention can be used for direct replacement of liquid injectors in road and rail diesels as well as off-highway truck and marine diesels with gaseous fuel injectors from onboard compressed gas storage tanks, or for stationary applications where the gas supply pressure is less than, say, 200 atm. Several versions of the invention are feasible for simple replacement of injectors without the need for engine modifications other than control system adaptation. Other versions are suitable for new designs of diesel engine heads.

Discussion Of The Physical Principles Applying To The Integrated Intensifier-Injector For Natural Gas For illustration of the basic principle of the invention, assume that compressed gas (or high pressure combustion gas) from the engine cylinder or another source of high pressure fluid is used in an intensifier &:o compress the natural gas fuel to a pressure sufficiently high for injection into the cylinder.

The following calculations confirm the viability of the invention. For purposes of illustration, an injection pressure of 200 atm of compressed natural gas fuel is assumed. It is also assumed that the minimum supply pressure from the tank is 20 atm. This 10:1 pressure ratio for natural gas is equivalent to a volume ratio of about $10^{1/1.3}=6$. A single stage of compression is feasible.

The volume of the intensifier is dependent on the volume of CNG entering the intensifier. At 20 atm and 300 K the CNG will have a density of $$\rho 1 = \frac{P}{RT} = \frac{20\,(101)\,16}{8.314\,(300)} \simeq 13 \text{ kg/m}^3$$

For a typical diesel engine of 1 liter displacement per cylinder, 17:1 compression ratio, 90% volumetric efficiency and a turbocharger pressure ratio of 1.3:1, the mass of air ingested per cycle is:

$$Ma = L_a N_v V_d = 1.2 * 1.3 * 0.9 * 1 \times 10^{-3} \simeq 0.0014 \text{ kg}$$

The stoichiometric fuel-air mass ratio for methane is 1 : 17.16 kg/kg so a maximum mass of natural gas injected per stroke is:

$$M_g \simeq M_a/20 \simeq 0.00007 \text{ kg}$$

Assuming injection pressure of the natural gas is 200 bar (200≃130 kg/m³, the maximum volume injected per stroke is:

$$V_{inj} = M_g/L200 \simeq 560 \text{ mm}^3$$

Assuming polytropic compression of the natural gas from the minimum supply pressure of 20 bar, the total volume of the fuel-gas side of the intensifier, $V_1$, is calculated as:

$$V_1 = V_2 * (P_{inj}/P_{min})^{1/n} \text{ where } V_2 = V_{inj} + V_{clear}$$

$V_2$ is the volume on the fuel gas side of the intensifier after compression of the gaseous fuel to injection pressure ($P_{inj}$) but before injection of the gas into the engine cylinder. Practical designs include passages for delivering the fuel to the engine combustion chamber which result in a small clearance volume, $V_{clear}$, that will contain high pressure gaseous fuel after completion of the injection event. Assuming a passage of 2 mm diameter and 100 mm in length, the clearance volume would be approximately 300 mm³. Using a polytropic coefficient of $n_{CNG}=1.25$ is used for the compression of the gas ($K_{CH4}=1.3$):

$$V_1 \simeq 5820 \text{ mm}^3$$

$$V_2 \simeq 850 \text{ MM}^3$$

Since the injection of the gaseous fuel may be desired at as much as 40° before top dead center (BTDC), the air pressure in the engine cylinder at this crank angle must be sufficient to pressurize the gaseous fuel to injection pressure. In a typical diesel engine, the piston has moved approximately 85% of the full stroke when the crank angle is 40° BTDC. As the intensifier piston moves to compress the gaseous fuel, the effective volume of the combustion chamber necessarily increases by the amount $V_{air}$:

$$V_{air} = (A_{air}/A_g) * (V_1 - V_2)$$

Increasing the turbocharger pressure ratio (within achievable limits) increases cylinder pressure which reduces intensifier area ratio, thus reducing the volume of air consumed by the intensifier ($V_{air}$), thus reducing the additional air required to maintain the original compression ratio of the engine. An iterative procedure for the typical diesel engine used above results in a turbocharger pressure ratio of 3.1 (versus the original 1.3) to maintain the same volumetric compression ratio ($17:1 * 1.3^{1/n} = 21:1$) and the resulting intensifier area ratio would be 11.1:1. For a single cylinder, an intensifier with 50 mm stroke would require a 41 mm bore on the air side, 12.2 mm bore on the gaseous fuel side.

Modification to the engine turbocharger/supercharger pressure ratio is essential to provide additional air for the intensifier while maintaining the equivalent engine compression ratio. An intake bypass control system would be necessary to adjust turbo boost depending on engine load (demand for fuel) and fuel supply pressure. The above example is for the worst case of maximum fuel demand and minimum supply pressure (specified as 20 bar). All other cases, i.e., for reduced engine load or higher fuel supply pressure, would require a lower turbo pressure ratio to maintain the original engine compression ratio.

This example pertains only to an intensifier for a single engine cylinder but is easily adaptable to multi-cylinder engines with either single or multiple intensifiers. Note that for a six cylinder version of the example engine, a single intensifier with 100 mm stroke would require 70 mm bore on the air side, 21 mm bore on the gaseous fuel side.

Other drive sources for the intensifier include high pressure hydraulic fluid from an external pump. In the case where the hydrualic fluid is at pressures higher than the desired gaseous fuel injection pressure, the intensifier would be driven by the small-area piston and the gaseous fuel would be compressed by the large-area piston. Note that the volume of the gaseous fuel compression side would remain the same while the drive side would be greatly reduced. For the above six-cylinder example with 5000 psi hydraulic drive, the drive side bore coupled be reduced to about 16 mm (from 70 mm). Since no air is used by the intensifier when driven by hydraulics, the turbocharger/supercharger need no Modification. The hydraulic driven intensifier could be controlled by varying the volume flow and/or pressure of hydrualic fluid by means of a variable displacement pump.

Figure 2:
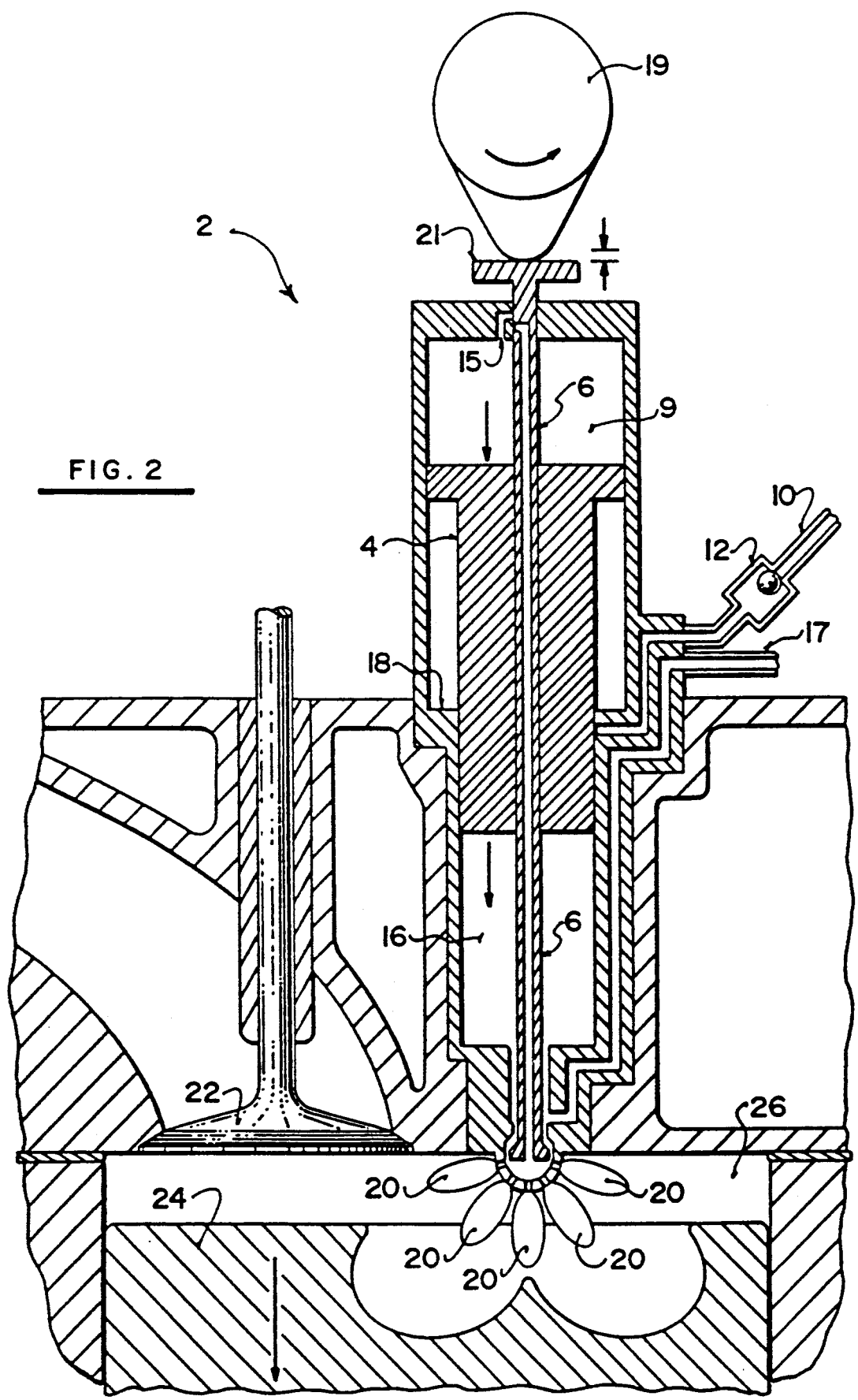
FIGS. 2 and 3 illustrate respective sequential operational views of the intensifier illustrated in FIG. 1.
Figure 3:
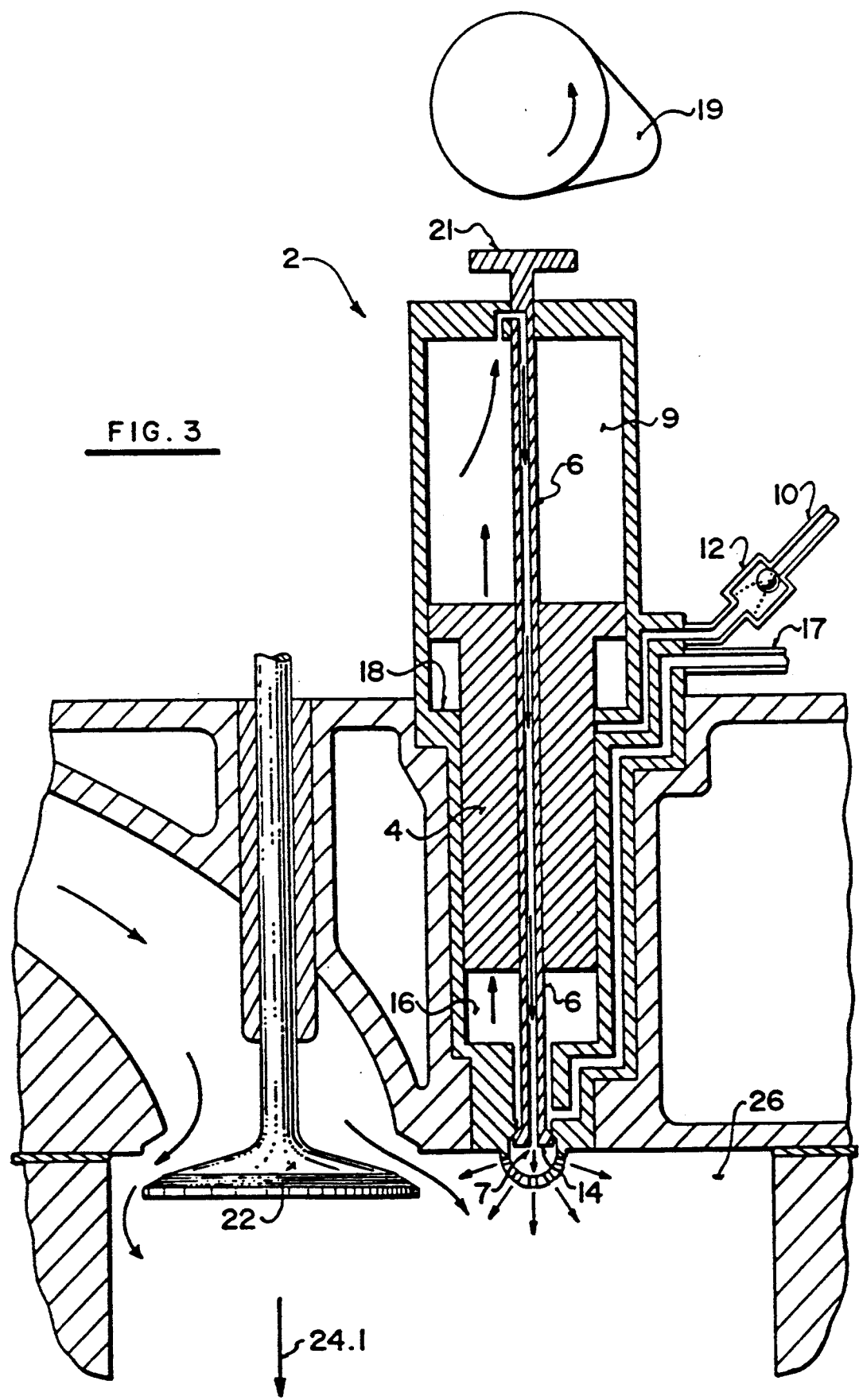

The discussion will now focus on specific embodiments of the invention. FIGS. 1, 2 and 3 show in schematic form, roughly to scale, one mechanical embodiment of the intensifier 2 and its operational sequence. The intensifier illustrated in FIG. 1 (adapted for use with a diesel engine) has two moving parts, namely an intensifier piston 4 and a hollow gas injector valve stem 6 which supplies compressed air through compressed air inlet 7 to the top surface of the intensifier piston 4 (as shown by directional arrows). Prior to gas injection, a nozzle 8 at the bottom of the intensifier 2 is closed and compressed gas from the engine chamber 26, caused by rising piston 24, is admitted to the chamber 9 above the intensifier piston 4 via hollow stem 6 and inlet 15. FIG. 1 shows the compressed gas from the engine chamber 26 entering the intensifier through inlet 7 and to the top of the piston 4 by inlet 15 and pushing piston 4 down. When the pressure exceeds about one-tenth that of the pressure in the gas supply 10, the intensifier piston 4 moves downwards in the interior cylinder 16 of the intensifier 2 thereby compressing the gas in cylinder 16, which is trapped by the check valve 12, thereby building the gas pressure in the chamber 16 to as high as 200 atm. Diesel fuel is supplied to the chamber 26 through an inlet 17.

As shown by FIG. 2, at fuel injection time, the gas injection valve 14 is opened by downward mechanical, hydraulic, pneumatic or electromagnetic actuation of its stem 6. A cam 19 is shown in FIGS. 1, 2 and 3, and pushes stem 6 downwardly a distance indicated at the top of FIG. 2 by hitting plate 21. This suddenly releases the gas pressure in chamber 16 through the nozzle opening 8 while simultaneously closing off the compressed gas from the engine chamber 26 through channel 16 via inlet 15 to the top of the intensifier piston 4. Fuel injection into chamber 26 is illustrated by plumes of droplets 20.

As shown by FIG. 3, when the downward valve stem 6 actuation by cam 19 terminates, the stem 6 rises and the valve 14 reseats. The chamber 9 at the top of the intensifier piston 4 is again in communication with the engine cylinder 26 and remains depressed in the downward position until the cylinder pressure in chamber 26 and 9 falls (during exhaust and intake strokes) below the pressure of the gas trapped in chamber 16 at the point of valve closure 14. The pressure of this trapped gas in chamber 16 returns the intensifier piston 4 to the top position (as seen in FIG. 1), thereby allowing a recharging of the supply gas through supply line 10 into chamber 16. The ultimate downward movement of piston 4 is limited by shoulder 18. Valve 22 in FIG. 3 is shown open to permit inlet air to enter the engine chamber 26. FIGS. 1, 2 and 3 illustrate a perforated hemispherical bulb 28 which is located below valve 14 and assists in dispersing the injected fuel into chamber 26.

When the supply pressure is high or engine demand is low (low load), the piston movement or speed will be low and the consumption of air from the engine cylinder will be small. Addition of, or modifications to existing turbocharger or supercharger is necessary to maintain adequate cylinder pressure for combustion if cylinder gas is used to drive the intensifier.

Variations and Adaptations of the Intensifier-Injector

Not shown in FIG. 1 but part of the overall concept are:
  (i) the means of metering the fuel supply according to engine load;
  (ii) the possibility of provision of liquid diesel fuel to the gaseous fuel valve port other than by "gas blast" injection of quantities large enough to supply an adequate ignition source;
  (iii) the adaptations of the concept to form a replacement for specific diesel fuel injectors for existing diesel engines e.g. DDA, Caterpillar, Cummins, International Harvester engines used in transportation. Such replacement could use existing engine injection timing methods and require no engine modifications other than injector replacement;
  (iv) the adaptations of the concept for fuels other than natural gas;
  (v) the mechanical arrangements for mechanical, hydraulic, pneumatic or electromagnetic valve stem actuation.
  (vi) the placement of an intensifier between cylinders to use combustion pressure from one cylinder to intensify the gas supply to a second cylinder.

Figure 4:
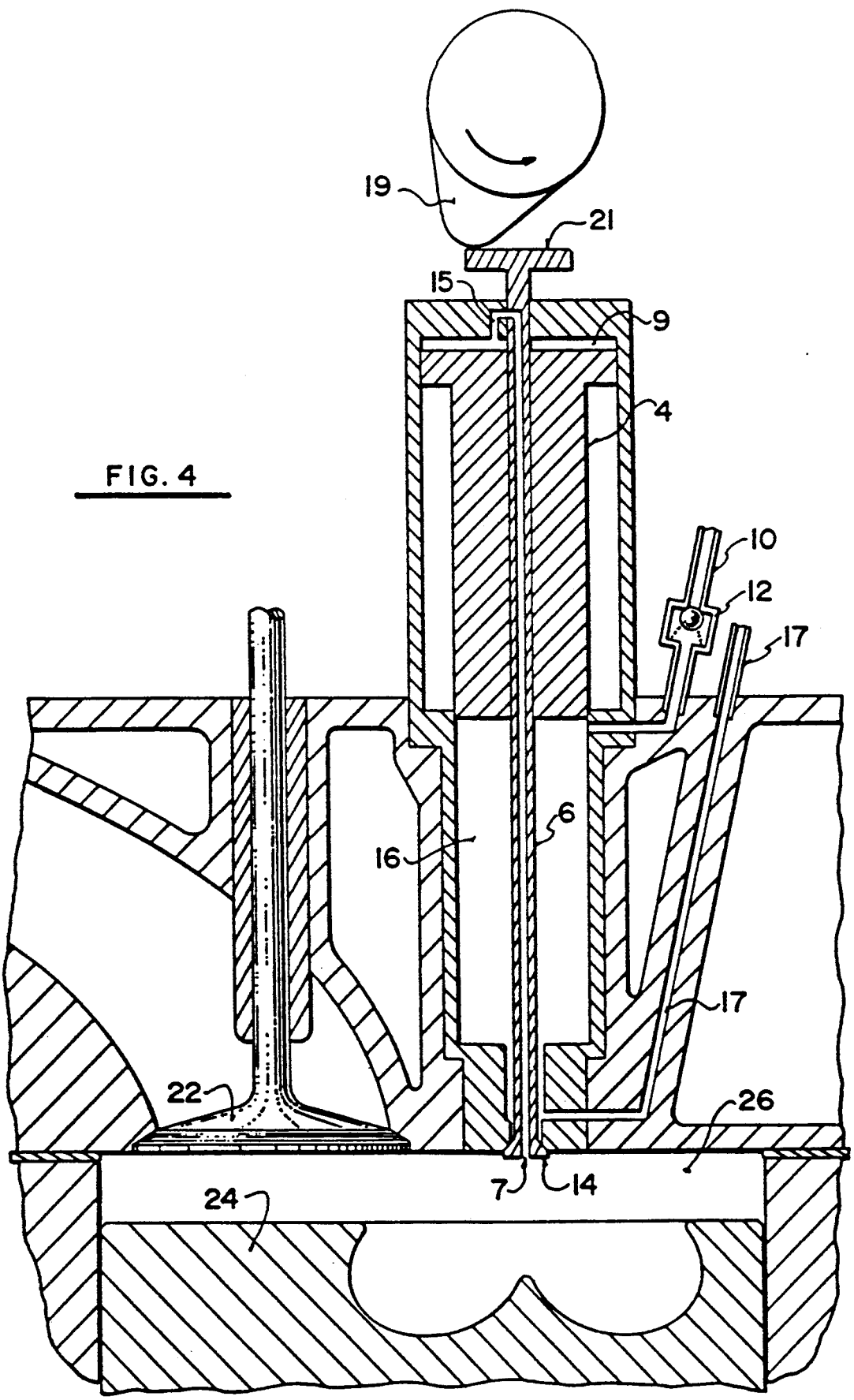
FIG. 4 illustrates a schematic view of the intensifier with a bare nozzle.
Figure 5:
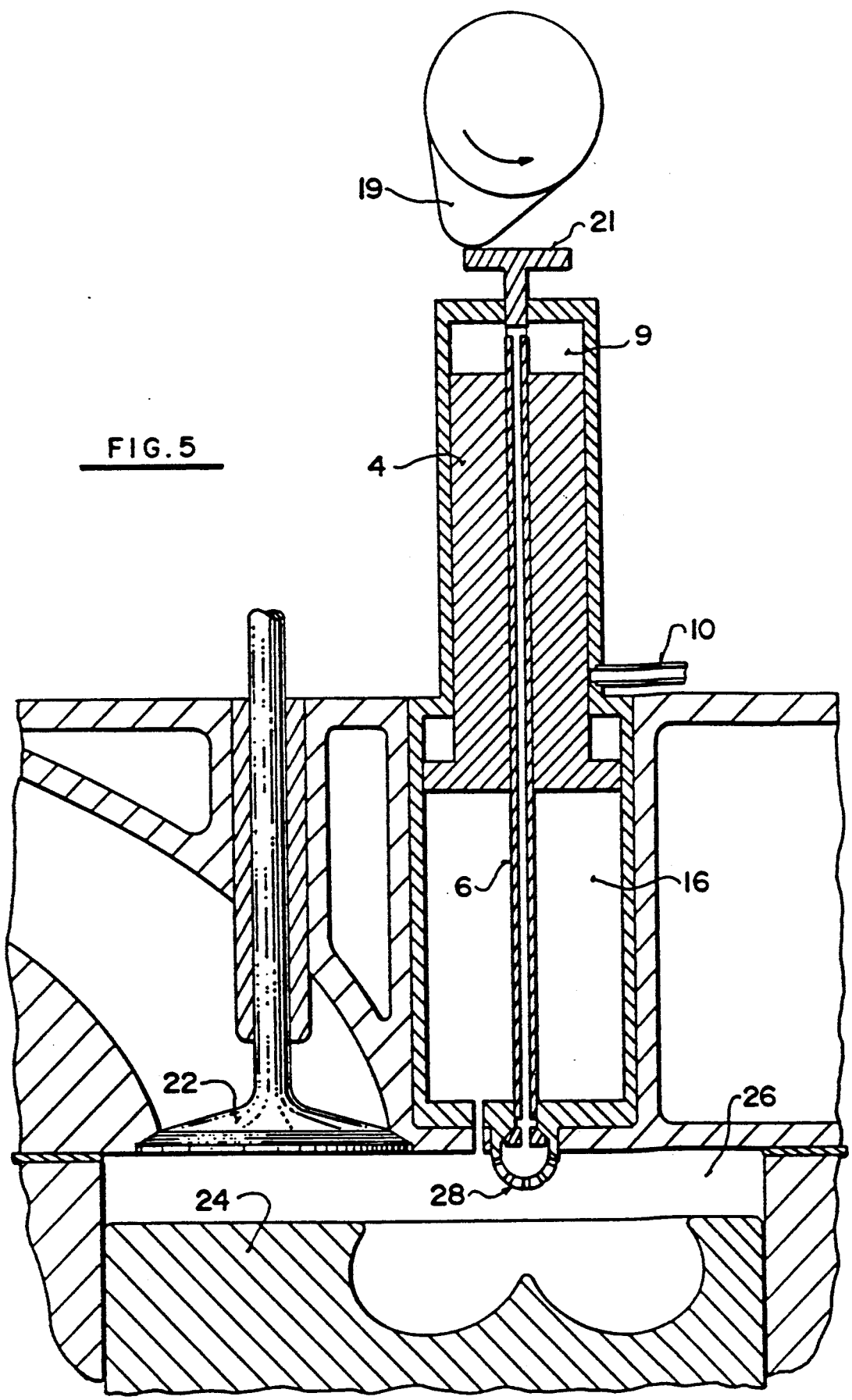
FIG. 5 illustrates a schematic view of the intensifier with an inverted piston.
Figure 6:
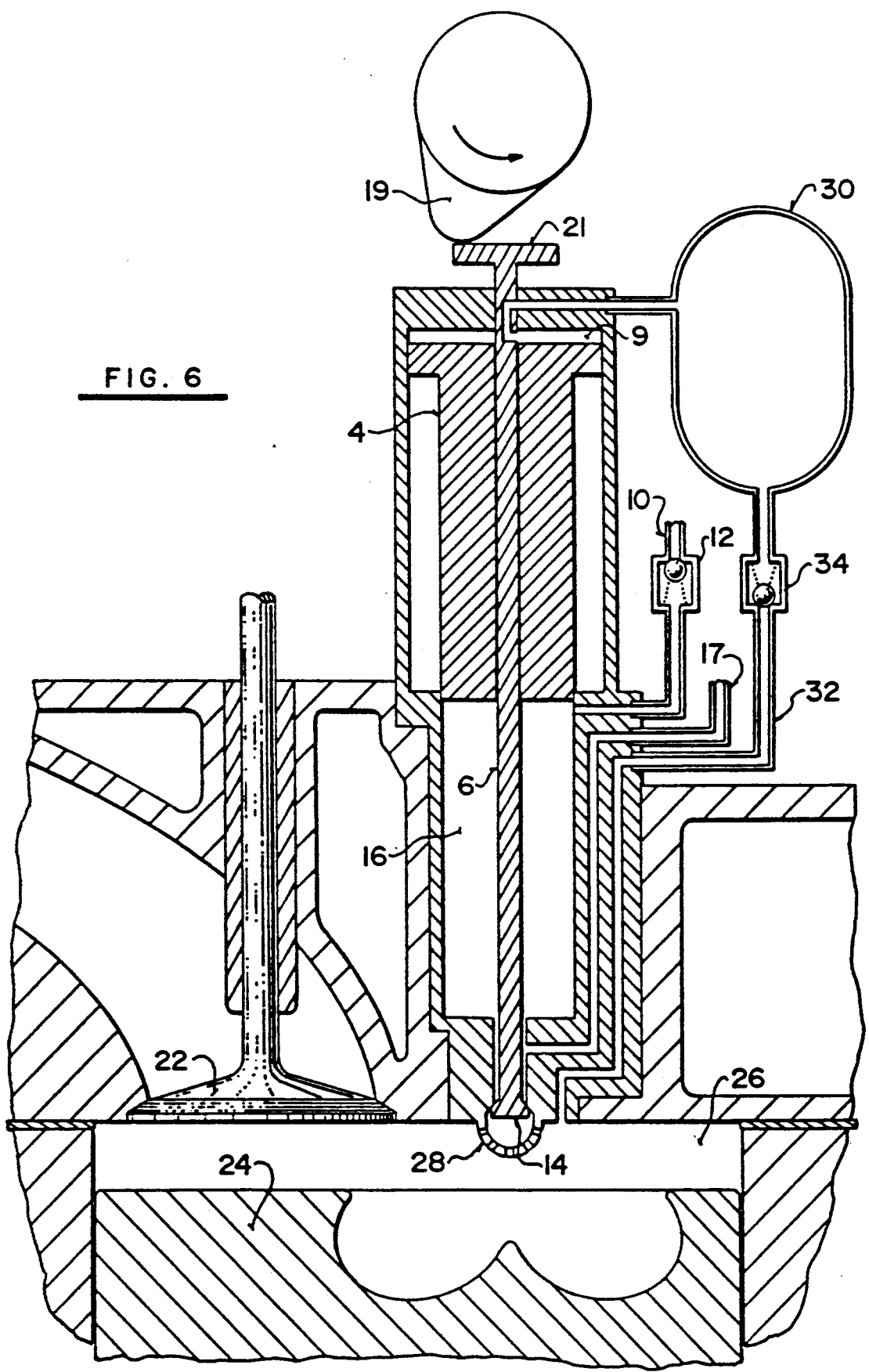
FIG. 6 illustrates a schematic view of the intensifier with an auxiliary compressed gas storage tank.

FIGS. 4, 5 and 6 show three o&:her embodiments of the intensifier-injector invention. FIG. 4 displays a variation of the injection nozzle arrangement, with no perforated hemispherical bulb 28 below the valve 14. A bulb 28 may not be necessary in certain situations. FIG. 5 shows an alternative intensifier piston 4 arrangement. The piston 4 as seen in FIG. 5 is inverted, which in certain instances may be attractive for performance purposes. The gas supply inlet 10 is located at a higher elevation in this embodiment.

Figure 7:
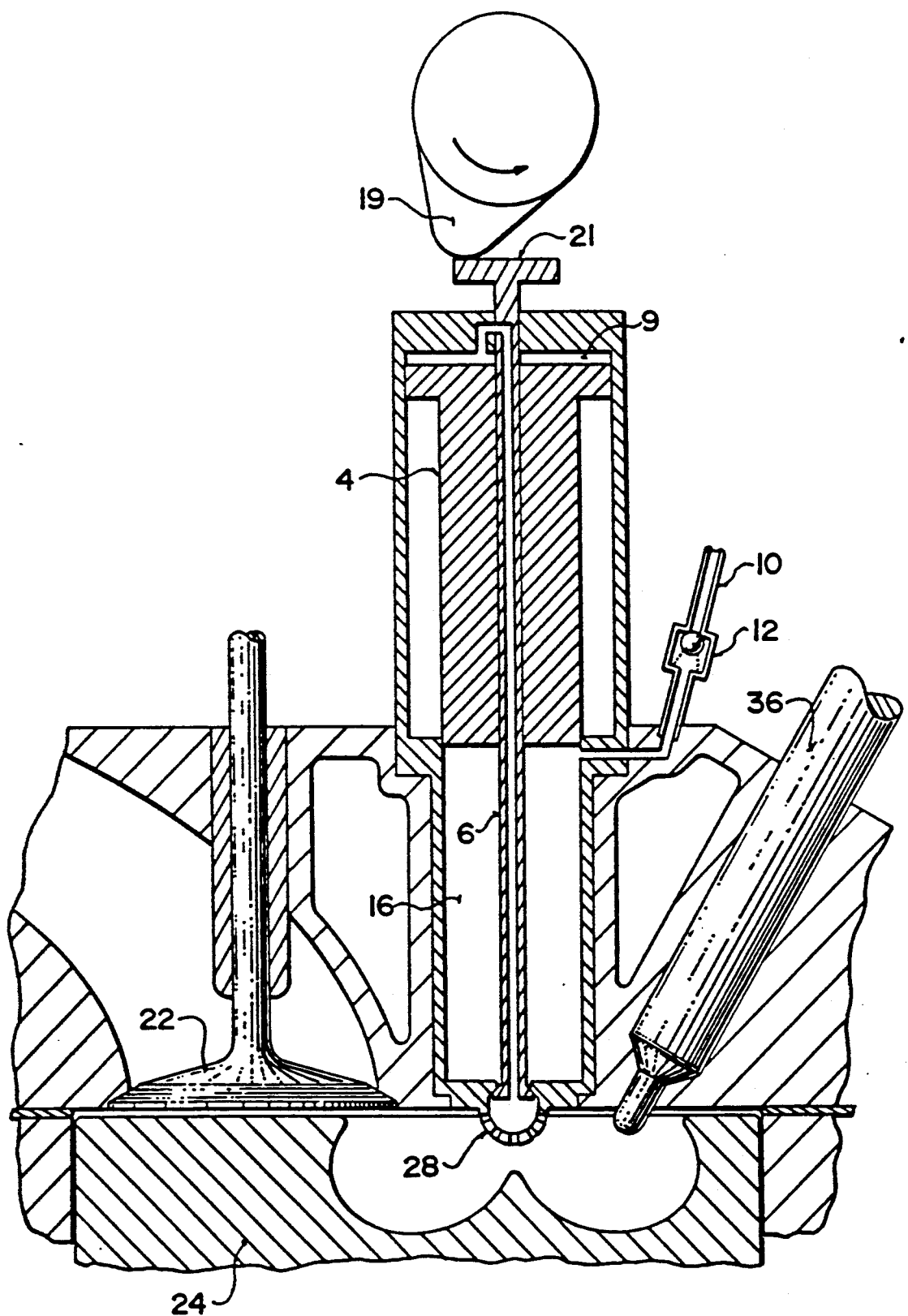
FIG. 7 illustrates a schematic view of the intensifier in combination with a diesel fuel injector.

FIG. 6 illustrates an external accumulator 30 in conjunction with the intensifier-injector 2. The accumulator 30 may be advisable in certain situations to provide a larger compressed gas capacity. FIG. 6 also illustrates a line 32 which has a check valve 34 and enables the pressure in chamber 26 to communicate with chamber 9. This is used instead of hollow stem 6 and inlet 15. FIG. 7 shows a separate diesel injector 36 coupled with an intensifier-injector 2.

Figure 8:
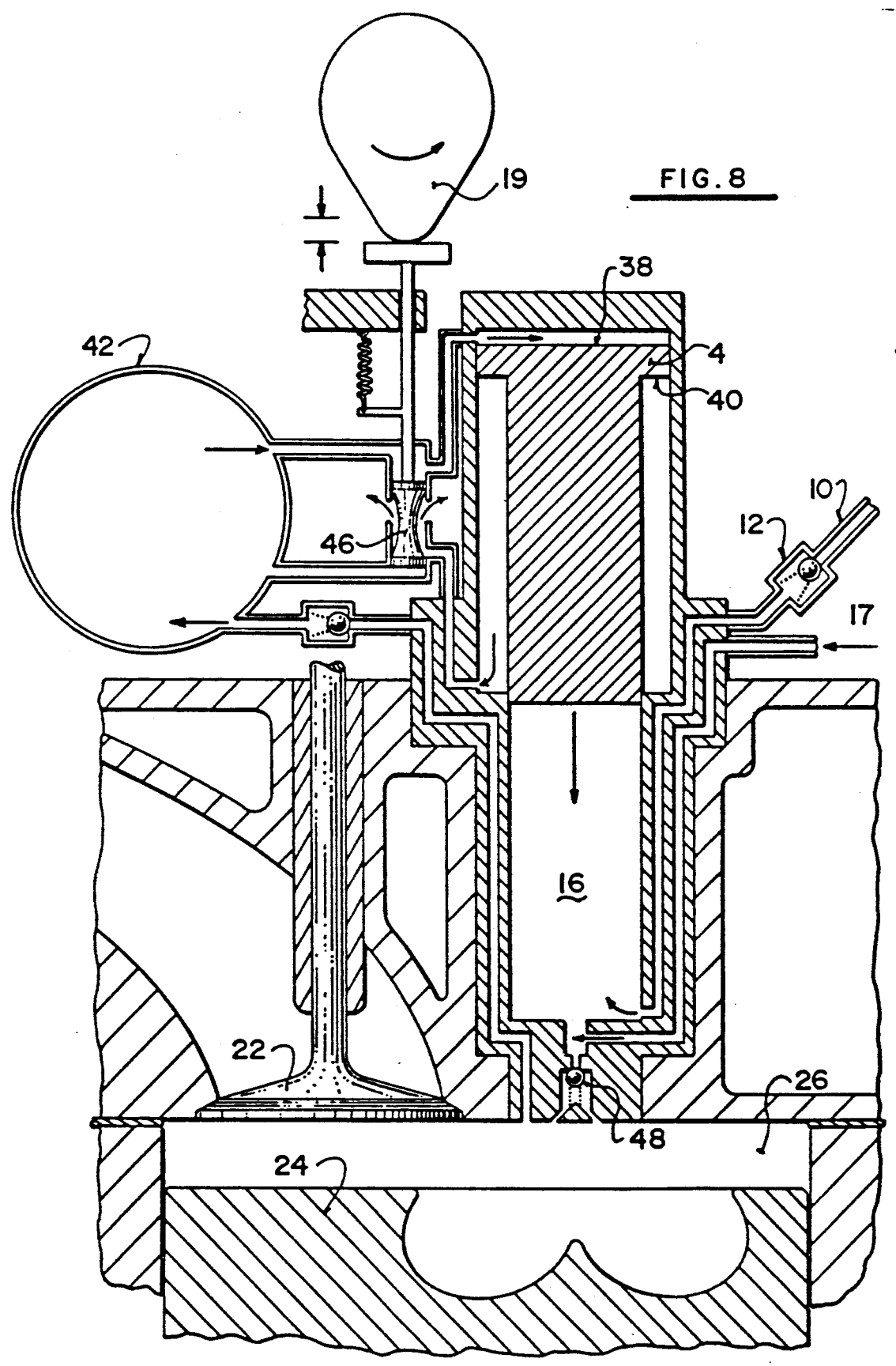
FIG. 8 illustrates a schematic view of the intensifier with connections adapted to drive the piston by differential pressures controlled by an external valve.

FIG. 8 shows an embodiment of the invention wherein the intensifier piston 4 is driven by differential pressures on its two unequal-area piston faces 38 and 40. The pressures are derived from an accumulator/high-pressure storage tank 42 which in turn receives post-ignition high-pressure gas from the engine combustion chamber 26 through a one-way check valve 44. These high-pressure stored gases are directed by a sliding spool valve 46 which is actuated by cam 19. This cam 19 is synchronized with the engine crank (not shown) and cam duration may be adjusted during engine operation to account for various required load levels. The fuel gas trapped under the small-area side 40 of the intensifier piston is compressed before being released into the combustion chamber 26 through a pressure relief valve 48 set at about 200 atmospheres. This system, though more complex than that shown in the previously discussed embodiments, should offer quicker intensifier piston response and movement due to the higher pressures available from the gas storage tank 42 and the quick acting sliding spool valve 46.

Figure 9:
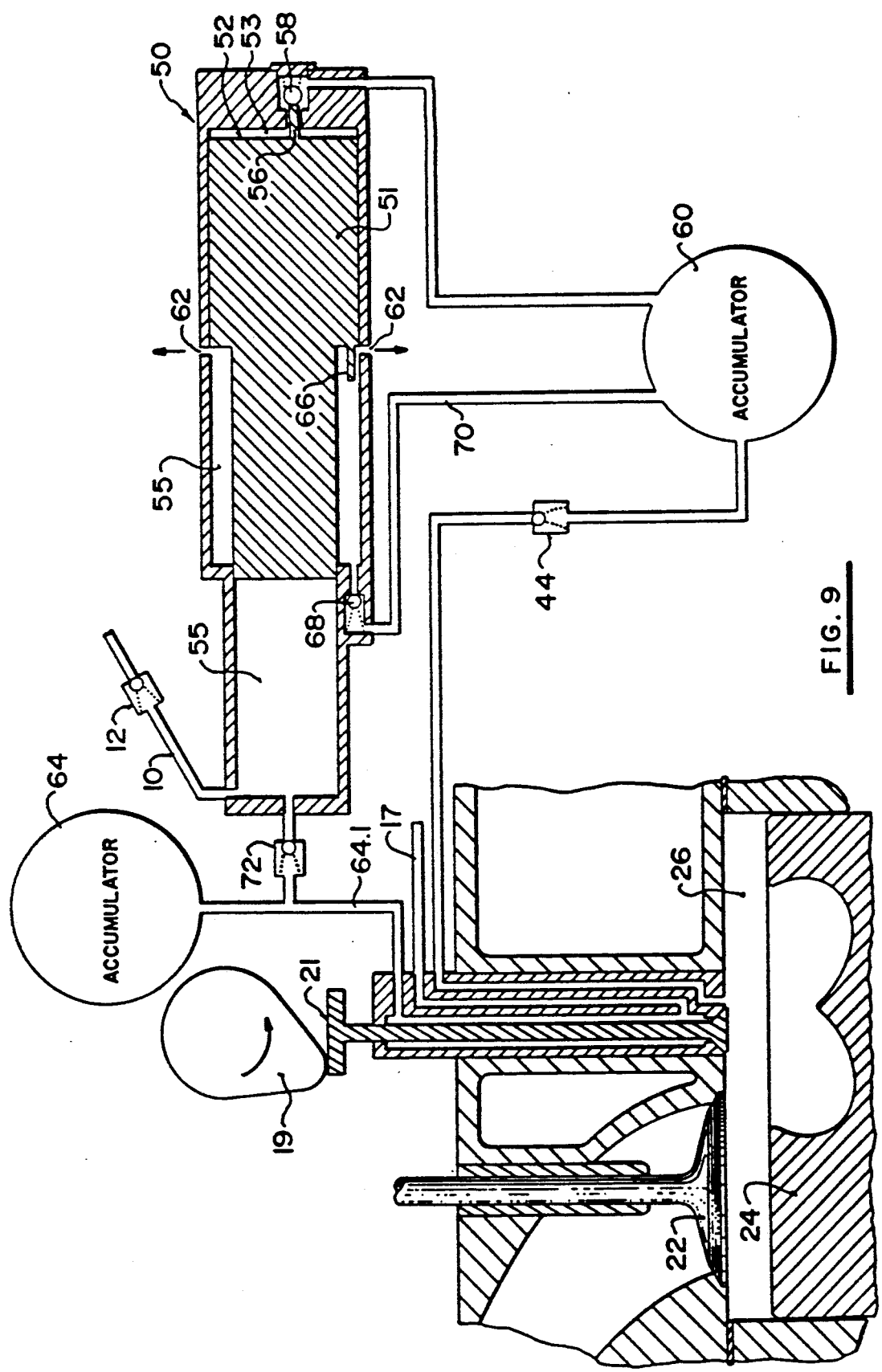
FIG. 9 illustrates a schematic view of an intensifier adapted for single-or multiple-cylinder engines.
Figure 10:
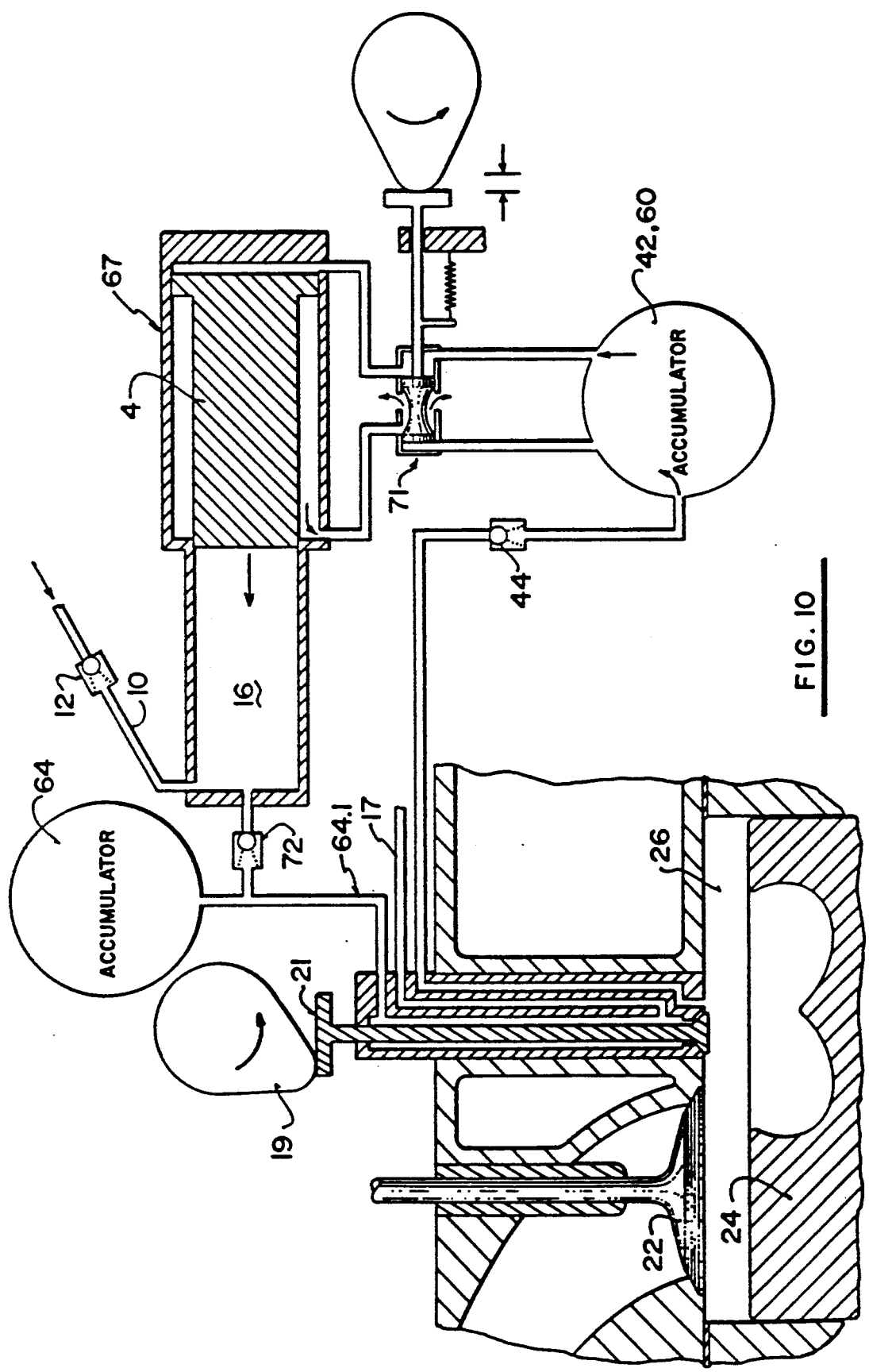
FIG. 10 illustrates a schematic view of the intensifier controlled by a cam actuated sliding spool valve.

FIGS. 9 and 10 disclose alterative embodiments incorporating the same theme. FIG. 9 illustrates a single intensifier unit 50 for single- or multiple-cylinder engines (though it is not limited by this application) which receives differential pressures on its two piston faces 52 and 54. The narrow protrusion 56 from the face 52 of the piston 51 pushes the sealing ball valve 58 off its seat thus allowing high-pressure gas from the compressed gas storage tank 60 to enter into the chamber 53 when the piston 51 is near top dead center (as seen in FIG. 9). Meantime, the expanded gases in the other chamber 55 are allowed to exit the chamber through a port 62 cut into the side of the cylinder 50. This same port 62 serves both chambers.

FIG. 9 also shows a check valve 68 and return line 70 which permit gas in chamber 55 to pass to tank 60 when activated by protrusion 66. The larger area piston 51 acts directly towards compressing the fuel gas at the far end of the chamber 55. This compressed fuel gas passes through one-way check valve 72 and is stored in an accumulator/high-pressure storage tank 64 where individual fuel supply lines (only one supply line 64.1 is shown) provide high-pressure fuel gas to individual engine chambers (not shown). Each engine chamber has a dual-fuel injector which is operated by a cam 19 or other means. The intensifier piston 51 oscillates at a speed independent of engine speed, though it may slow, down when the engine slows down due to less availability of high-pressure gas from the engine cylinders. While this embodiment is relatively simple, an auxiliary mechanism may be required to start the piston oscillations when the engine is started. This "embodiment" should offer easy adaptation to existing hardware since the intensifier and tanks may be located away from the limited-space engine chamber area.

The embodiment illustrated in FIG. 10 is similar to that shown in FIG. 9, but the intensifier 67 is controlled by a cam 69 actuated sliding spool valve 71. This mechanism is very similar to that shown in FIG. 8 and the same description applies and should be readily understandable to a person skilled in the art. As in FIG. 9, the high-pressure fuel gas is stored and distributed from a tank 64. Also, each chamber has its own dual-fuel injector.

Figure 11:
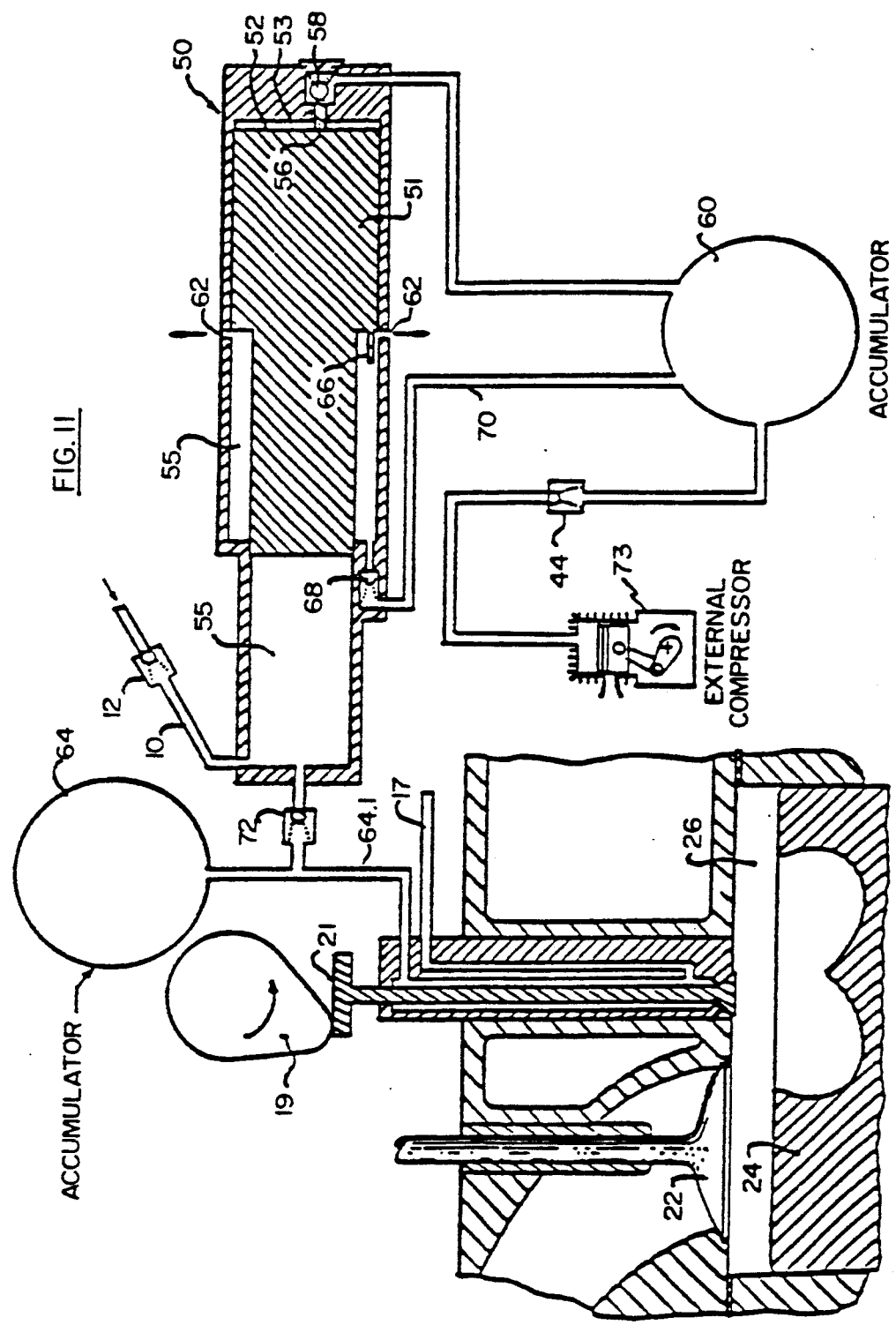
FIG. 11 illustrates a schematic view of an intensifier driven by compressed gas from an external compressor.

The embodiment illustrated in FIG. 11 is similar to that shown in FIG. 9, but the intensifier is driven by compressed air from an external compressor 73 (e.g. an air-brake or air-starter compressor).

Figure 12:
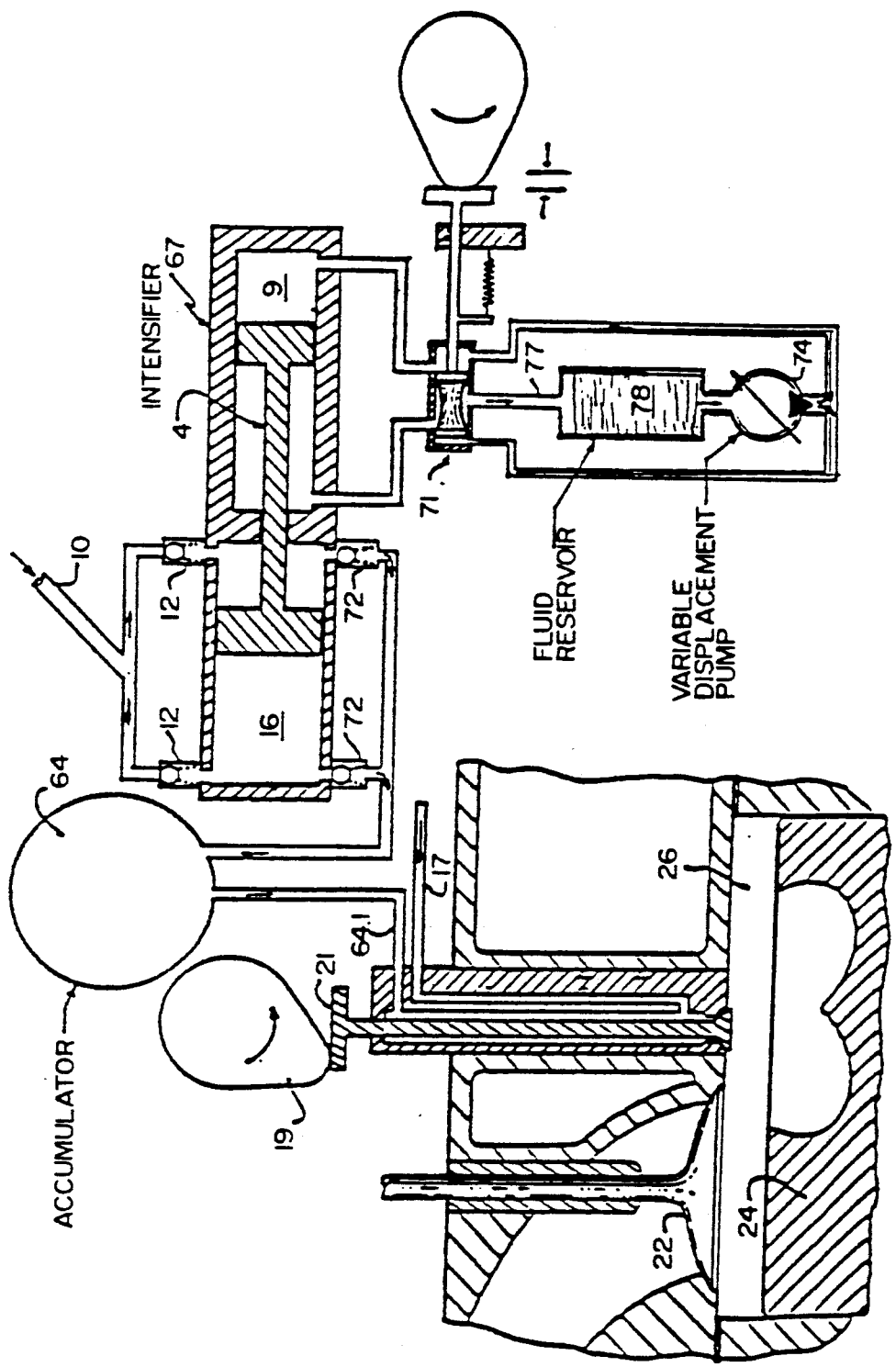
FIG. 12 illustrates a schematic view of an intensifier driven by pressurized fluid from an external pump.

The embodiment illustrated in FIG. 12 is similar to that shown in FIG. 11, but the intensifier is driven by pressurized fluid (e.g. hydraulic diesel or lube oil) from an external pump 74.

High-pressure fluid is directed to the appropriate end of the double-acting hydraulic cylinder 9 by a directional control spool valve 71. The directional control valve 71 simultaneously opens the opposite side of the hydraulic cylinder to the low pressure reservoir 78 via the return line 77. Hydraulic flow rate and/or pressure can be controlled to regulate reciprocation speed of intensifier and hence maintain the desired flow rate of gaseous fuel to the engine. Gaseous flue flow to and from the double-acting intensifier can be controlled solely by check valves (12 and 72). High pressure gaseous fuel is stored in the gaseous fuel accumulator 64 for injection into the engine controlled by the poppet valve 21. A small quantity of diesel fuel is admitted through the diesel line 17 into the engine combustion chamber 26 with the gaseous fuel to provide an ignition source (pilot ignition case).

FIG. 12 illustrates the case where the hydraulic fluid is delivered to the intensifier at a higher pressure than that required for fuel gas injector and hence the piston area of the hydraulic cylinder is smaller than that of the fuel gas cylinder.

Figure 13:
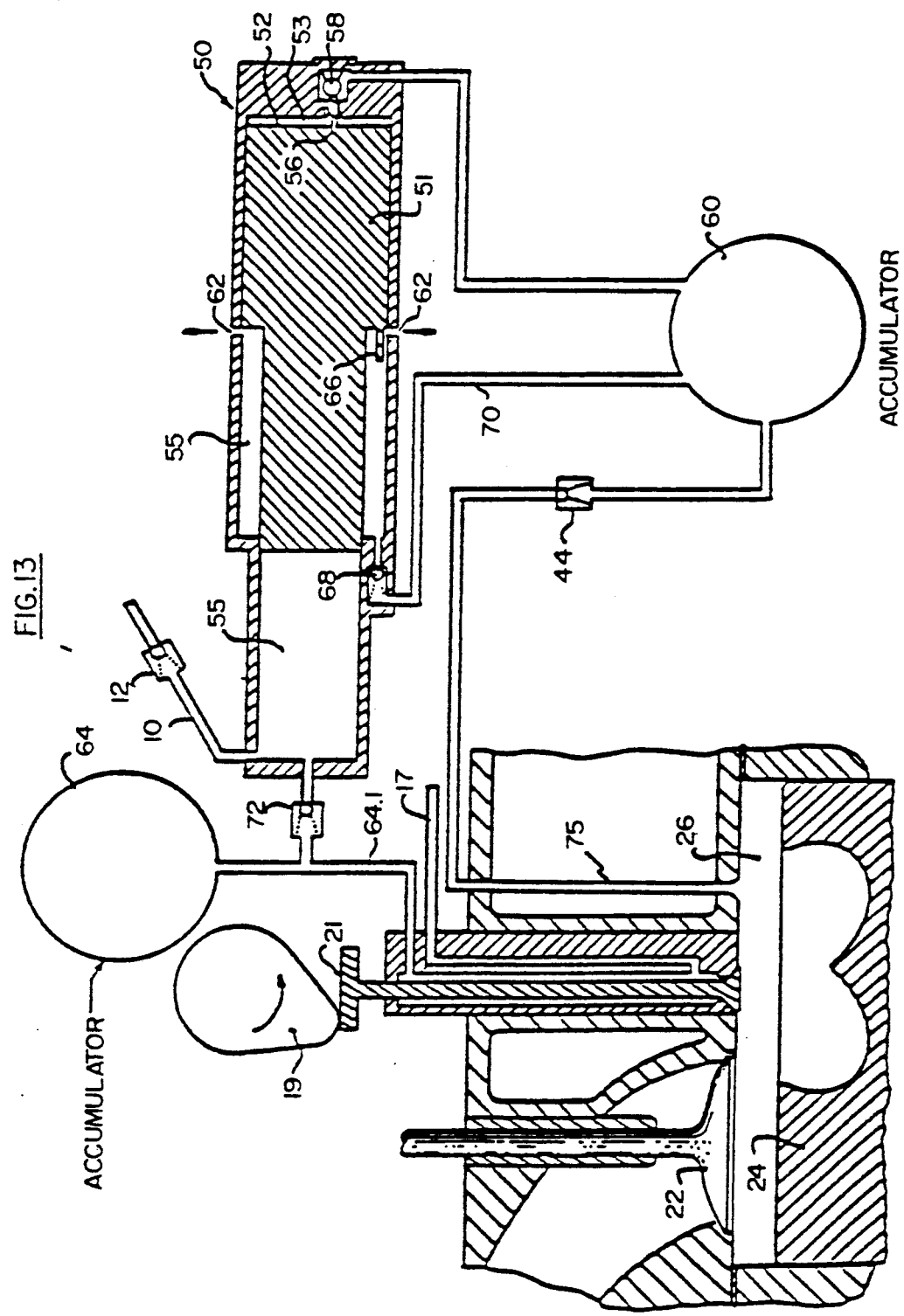
FIG. 13 illustrates a schematic view of an intensifier driven by compressed gas from the engine cylinder chamber by means of a port in the engine cylinder head.

The embodiment illustrated in FIG. 13 is similar to that shown in FIG. 9, but the compressed gas from the engine cylinder chamber for driving the intensifier is provided by way of a port 75 in the engine cylinder head external to the injector.

The embodiment illustrated in FIG. 14 is similar to that shown in FIG. 12, but the intensifier is driven by high pressure fluid (e.g. diesel or lube oil) from an cam driven plunger 75. The high pressure fluid acts on the small area end of the intensifier piston to compress the fuel gas existing in the follow chamber of the large area end of the intensifier piston. Exhausted fluid is returned to &:he reservoir 78 by the spool valve 71 through the return line 77.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. An intensifier-injector for gaseous fuels in internal combustion engines comprising means which utilizes the compressed gas from the chamber of the interhal combustion engine or another source of high pressure gas or fluid to drive an intensifier means which raises the pressure of fuel gas to a constant pressure sufficient for rapid injection into the cylinder of the internal combustion engine regardless of the fuel gas storage pressure or engine demand for fuel.

2. An apparatus as claimed in claim 1 wherein the internal combustion engine is a positive displacement engine.

3. An apparatus as claimed in claim 2 wherein the gaseous fuel is drawn from a variable pressure gaseous fuel supply maintained within required limits to allow single-stage compression and reduce power consumption by the intensifier-injector.

4. An intensifier-injector for fuel gas used in combination with an internal combustion engine having a cylinder chamber which intensifier-injector comprises:
    (a) a hollow chamber means;
    (b) a reciprocating intensifier means having a large area end and a small area end mounted within the interior of the hollow chamber means;
    (c) a means for introducing compressed gas from the cylinder chamber or other source of pressurized fluid or gas into the hollow chamber means on the large area end of the intensifier means;
    (d) one-way means for enabling fuel gas to be supplied into the hollow chamber means at the small area end of the intensifier means;
    (e) injector nozzle means for enabling the fuel gas at the small area end of the intensifier means to be injected into the cylinder chamber; and
    (f) timing means synchronized with the internal combustion engine for opening the compressed gas the injection nozzle means (e).

5. An apparatus as defined in claim 4 wherein the hollow chamber means is a hollow cylinder.

6. An apparatus as claimed in claim 5 wherein the intensifier means is a piston which reciprocates axially within the interior of the hollow chamber means.

7. An apparatus as claimed in claim 6 wherein the fuel gas supply means (d) has therein a one-way valve to prevent fuel gas supplied to the interior of the hollow chamber means at the small area end of the piston from being expelled through the fuel gas supply means.

8. An apparatus as claimed in claim 7 wherein fuel gas injected from the hollow chamber means at the small area end of the piston into the engine cylinder chamber is controlled by a valve-stem which links the engine cylinder chamber with the hollow chamber means at the large area end of the intensifier piston means.

9. An apparatus as claimed in claim 8 wherein the interior of the valve-stem is hollow and permits compressed gas from the engine cylinder chamber or other source to be introduced into the hollow chamber means at the large area end of the intensifier piston through the interior of the valve-stem, while at the same time preventing fuel gas from being injected from the hollow chamber means at the small area end of the piston into the engine cylinder chamber.

10. An apparatus as claimed in claim 9 wherein the valve-stem means is positioned axially within the interior of the hollow chamber means, and the piston, and the valve-stem is reciprocated axially within the hollow chamber means in order to alternatively open and close a gas injection nozzle mounted at the end of the hollow chamber means proximate the engine cylinder chamber.

11. An apparatus as claimed in claim 10 wherein the piston slides up and down the valve stem.

12. An apparatus as claimed in claim 11 wherein when the valve-stem means is in a nozzle open position, thereby permitting fuel gas to be injected from the interior of the hollow chamber means at the small area end of the piston, compressed gas from the engine cylinder chamber cannot be introduced through the hollow valve-stem into the hollow chamber at the large area end of the intensifier position.

13. An apparatus as claimed in claim 12 wherein when the valve-stem is in a nozzle closed position, compressed gas from the engine cylinder chamber is introduced through the hollow valve stem into the hollow chamber means at the large area end of the intensifier piston.

14. An apparatus as claimed in claim 13 wherein the timing means is a cam means synchronized to an engine crank of the engine.

15. An apparatus as claimed in claim 13 wherein the timing means is an electrical timing means synchronized to an engine crank of the engine.

16. An apparatus as claimed in claim 13 wherein the timing means is a hydraulic timing means synchronized to an engine crank of the engine.

17. An apparatus as claimed in claim 13 wherein the timing means is a pneumatic timing means synchronized to an engine crank of the engine.

18. An apparatus as claimed in claim 4 wherein a pilot of quantity of liquid fuel from a liquid fuel supply means is injected into the engine chamber simultaneously with the fuel gas injection when the nozzle is in an open position.

19. An apparatus as claimed in claim 14 wherein liquid fuel from a solid fuel supply means is injected into the engine chamber when the nozzle means is in an open position.

20. An apparatus as claimed in claim 4 wherein compressed gas from the engine cylinder chamber is conveyed to a compressed gas storage means before being introduced into the hollow chamber means at the large area end of the intensifier means.

21. An apparatus as claimed in claim 20 wherein a one-way valve controls the flow of gas from the engine cylinder chamber to the compressed gas storage means.

22. An apparatus as claimed in claim 21 wherein a valve means controls the flow of gas from the compressed gas storage means to the hollow chamber at the large area end of the intensifier means.

23. An apparatus as claimed in claim 22 wherein the valve means is controlled by a cam means synchronized to an engine crank of the engine.

24. An apparatus as claimed in claim 20 wherein a one-way valve activated by the intensifier means when it is in a position proximate to the large area end of the hollow chamber means is located between the compressed gas storage means and the hollow chamber at the large area end of the intensifier means.

25. An apparatus as claimed in claim 24 wherein a one-way valve activated by the intensifier means when it is in a position proximate to the small area end of the hollow chamber, means is located in a fuel gas supply line connecting the hollow chamber means at small area end of the hollow chamber means and the compressed gas storage means.

26. An apparatus as claimed in claim 25 wherein an exit port is located in the wall of the hollow chamber means of the intensifier which port is open to atmosphere when the intensifier means is in a position proximate to the large area end of the hollow chamber means.

27. An apparatus as claimed in claim 24 wherein an exit port is located in the wall of the hollow chamber means of the intensifier which port is open to atmosphere when the intensifier means is in a position proximate to the small area end of the hollow chamber means.

28. An apparatus as claimed in claim 27 wherein a compressed fuel gas tank and a one-way valve are located in a conduit connecting the hollow chamber means of the intensifier at the small area end of the intensifier means and the nozzle means.

29. An apparatus as claimed in claim 28 wherein the valve means is controlled by a cam means synchronized to an engine crank of the engine.

30. An apparatus as claimed in claim 20, wherein a valve means alternatingly controls flow of compressed gas from the compressed gas storage means to the large area end of the intensifier means and the small area end of the intensifier means.

31. An apparatus as claimed in claim 4 wherein a preset pressure relief valve controls the flow of fuel gas from the hollow chamber at the small area end of the intensifier means into the engine cylinder chamber.

32. An apparatus as claimed in claim 4 wherein the internal combustion engine has a plurality of engine cylinder chambers which supply compressed gas to the compressed gas storage tank.

33. An apparatus as claimed in claim 4 wherein the internal combustion engine has a plurality of engine cylinder chambers and the chambers are supplied with fuel gas from a compressed fuel gas tank.

34. An apparatus as claimed in claim 20 wherein the internal combustion engine has a plurality of engine cylinder chambers which supply compressed gas to the compressed was storage tank.

35. An apparatus as claimed in claim 25 wherein the internal combustion engine has a plurality of engine cylinder chambers and the chambers are supplied with fuel gas from a compressed fuel gas tank.

36. An apparatus as claimed in claim 4 wherein the intensifier means is internal to the injector means.

37. An apparatus as claimed in claim 4 wherein the intensifier means is external to the injector means.

38. An apparatus as claimed in claim 8 wherein the cylinder head chamber houses a port means to permit compressed gas from the engine cylinder chamber to be introduced into the hollow chamber means at the large area end of the intensifier piston means.

39. An apparatus as claimed in claim 4 wherein an engine intake or exhaust valve location is modified to permit compressed gas from the engine cylinder chamber to be introduced into the hollow chamber means at the large area end of the intensifier piston means.

40. An apparatus as claimed in claim 8 wherein an annular passage surrounding the injector means permits compressed gas from the engine cylinder chamber to be introduced into the hollow chamber means at the large area end of the intensifier piston means.

41. An apparatus as claimed in claim 5 wherein compressed gas from an external compressor means is introduced into the hollow chamber means at the large area end of the intensifier piston means.

42. An apparatus as claimed in claim 5 wherein pressurized fluid from an external pump means is introduced into the hollow chamber means at the large area end of the intensifier piston means.

43. An apparatus as claimed in claim 5 wherein high pressure fluid from an external pump means is introduced into the hollow chamber means at the small area end of the intensifier piston means to compress the fuel gas in the hollow chamber means at the large area end of the intensifier piston means.

44. An apparatus as claimed in claim 4 wherein the timing means is an electrohydraulic timing means synchronized to an engine crank of the engine.

45. An apparatus as claimed in claim 4 including:
  (a) control means to vary the supply rate of pressurized fuel gas from the large area end of the intensifier means;
  (b) liquid fuel atomizing means and nozzle means for injecting liquid pilot fuel into the gaseous fuel and/or the engine combustion chamber.

46. A method of intensifying the pressure of gaseous fuel introduced into the compression cylinder of an internal combustion engine which comprises:
  (a) admitting fuel gas into the interior of a gas pressure intensifier means having disposed therein an intensifier means which is in a position which separates the gas pressure intensifier means into first and second chambers, the fuel gas being admitted into the first chamber which is connected to the internal combustion engine by injection nozzle means;
  (b) admitting compressed gas or fluid from an intensifier drive source from the compression cylinder to the second chamber of the intensifier means, to a point wherein the gas or fluid pressure in the second chamber causes the intensifying means to move and thereby increase the pressure in the first chamber;
  (c) permitting the compressed fuel gas in the first chamber to be expelled into a pressurized fuel gas storage cylinder or directly into the interior of the engine combustion chamber through the injection nozzle means;
  (d) permitting the injection nozzle means to close and simultaneously cause the intensifier means to reset to the position in step (a) above, thereby permitting the first chamber to be recharged with fuel gas.

47. A method as claimed in claim 46 wherein the surface area of the intensifier means facing the first and second chambers respectively are equal.

48. A method as claimed in claim 46 wherein the surface areas of the intensifier means facing the first and second chambers respectively are unequal.

* * * * *